Sept. 12, 1967  E. C. KNIGHT  3,340,612
ELECTRIC TREE PRUNING SAW
Filed Jan. 14, 1966
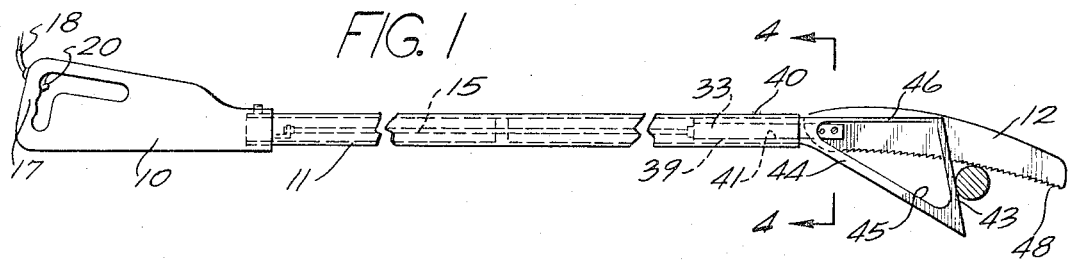
INVENTOR
ERWIN C. KNIGHT
ATTORNEY

United States Patent Office 3,340,612
Patented Sept. 12, 1967

3,340,612
ELECTRIC TREE PRUNING SAW
Erwin C. Knight, Watertown, Wis., assignor to McGraw-Edison Company, Milwaukee, Wis., a corporation of Delaware
Filed Jan. 14, 1966, Ser. No. 520,759
4 Claims. (Cl. 30—166)

ABSTRACT OF THE DISCLOSURE

An electric pruning saw comprising an elongated pole having a motor at one end and a saw blade reciprocally mounted at its other end, means for converting rotation of said motor into reciprocation of said blade and means for supporting a saw blade against deflection and buckling and providing support of a limb to be cut in continuous positive cutting contact with the saw blade.

---

This invention relates to tree pruning saws and in particular to power operated tree pruning saws of the extension handle type.

It is an object of the invention to provide a tree pruning saw which is operated by an electric motor and enables a trimmer to easily and quickly prune, at substantial height above the ground, tree branches thicker than can be conveniently cut by a clipper.

Another object of the invention is to provide such a tree pruning saw which can derive energy for operation from a portable electric generator or from a battery.

It is a further object of the invention to provide an electric motor operated pruning saw of the extension type having a novel cross head and blade guide of light weight at the cutting end which holds the tree limb being cut and prevents twisting of the driven end of the elongated blade operating means and guides the saw blade during cutting to maintain it rigid and prevent buckling thereof and to keep it in proper cutting engagement with the limb.

These and other objects and advantages of the invention will be more readily apparent from the following detailed description when considered in conjunction with the accompanying drawing wherein:

FIG. 1 is a perspective view of a preferred embodiment of the invention.

FIG. 2 is a view, partly in section, of the handle end of the embodiment of FIG. 1 showing the power transmitting means in dotted lines;

FIG. 3 is an exploded perspective view of the cutting end of the embodiment of FIG. 1;

FIG. 4 is a view taken along line 4—4 of FIG. 1, and

FIG. 5 is a cross section view through an extension which may be inserted in the pruning saw of FIG. 1.

Referring to the drawing, the electric motor actuated tree pruning saw of the invention includes a motor housing 10 affixed to one end of an elongated tubular pole 11 carrying a saw blade 12 at its other end. Housing 10 encloses an electric motor 13 adapted through suitable power transmitting means 14 to reciprocate an elongated operating rod 15 axially within tubular pole 11 to actuate saw blade 12. Housing 10 may include a handle portion 17 permitting the operator to conveniently hold the saw from the top or the rear end thereof.

Energy for operating motor 13 may be derived from a suitable source of electric power such as a portable electric generator (not shown) over a flexible electric cord 18 extending from housing 10, and a trigger switch 20 may be provided in handle portion 17 to complete an energizing circuit to motor 13. It will be appreciated that this construction is considerably lighter in weight and provides the operator with greater freedom of action than with conventional power saws which are integral with an internal combustion engine. Power transmitting means 14 may include a pinion 21 affixed to the shaft of motor 13 and engaging a spiral bevel gear 22 which is connected to a stub shaft carrying a small diameter spur gear 24. A larger diameter spur gear 26 meshing with gear 24 may be affixed to a stub shaft 27 and carry at a point spaced radially away from its center of rotation a depending cam pin 30 which fits into an elongated transverse slot 31 in a slotted yoke member 32 to derive rectilinear motion of yoke member 32 from rotation of spur gear 26. Suitable guides (not shown) may limit yoke member 32 to longitudinal movement only. Slotted yoke member 32 extends into the axial opening in tubular pole 11 and terminates in an upstanding portion 34 having a tapped hole therein in which the threaded end of operating rod 15 is engaged.

Tubular pole 11 is preferably of a rigid and mechanically strong but light weight material such as aluminum to facilitate cutting at considerable height above the ground, and operating rod 15 extends axially through tubular pole 11 and is affixed at its other end to a driven blade supporting member 33 of non-circular cross section, preferably square. Blade support member 33 extends beyond the end of pole 11 and has an elongated slot 34 therein receiving the saw blade 12. Saw blade 12 may be secured to support member 33 by a pin 35 and a screw 36.

Tubular pole 11 terminates in a limb holder and saw blade guide 38. Guide 38 has a cylindrical shank 39 which fits within the end of tubular pole 11 and may be secured thereto by a screw 40. Cylindrical shank 39 has an axial bore 41 of non-circular cross section complementary to non-circular blade support member 33 and in which blade support member 33 reciprocates to prevent turning and twisting of the outer end of operating rod 15 and the driven end of saw blade 12 during pruning. At the end opposite shank 39 guide 38 has an integral transverse cross head 43 which holds the tree limb during cutting while saw blade 12 is being actuated on the back stroke toward motor housing 10. Guide 38 also has a brace 44 integral with both cross head 43 and shank 39 which mechanically strengthens cross head 43 and a triangular opening 45 defined by cross head 43 and brace 44 which substantially decreases the weight of the pruning saw.

Transverse cross head 43 and the portion 46 of guide 38 between cross head 43 and shank 39 are bifurcated and receive the saw blade 12, and the furcations 47 form a guide slot for saw blade 12 and prevent undue lateral deflection thereof. The brace 44 constitutes the web which unites the furcations 47 that guide the saw blade 12 during cutting to maintain it rigid and prevent buckling of the saw blade. The saw blade 12 is of the curved form with rip saw teeth 48 on the concave side adapted to cut on the back stroke toward the cross head 43 for efficient cutting. The concave curvature of the toothed edge of saw blade 12 increases the efficiency of cutting because the blade rises and falls in the wood as it is reciprocated, thereby assuring that every tooth 48 bites into the wood and makes the weight of the saw a useful factor insofar as keeping the saw teeth in good contact with the limb being cut.

Motor housing 10 may have an annular portion 49 at its forward end which receives the tubular pole 11 and a reduced diameter portion forming a shoulder 50 against which the end of pole 11 abuts. Tubular pole 11 may be affixed to housing 10 by a screw 52.

If desired, an elongated extension 53 may be inserted between housing 10 and pole 11 as shown in FIG. 5 to permit severing of branches at greater height above the ground. Extension 53 may be an aluminum tube of the same diameter as pole 11 and adapted to fit within annular portion 49 of housing 10 and have an enlarged diameter sleeve portion 54 at its other end which receives one end of pole 11. An elongated connecting rod 53 extending axially through extension 53 is slidable within a suitable annular support 56 affixed within extension 53. One threaded end of connecting rod 55 is engaged within upstanding portion 34 of slotted yoke member 32, and the other end carries an enlarged diameter internally threaded portion 58 which receives the threaded end of operating rod 15.

In contrast to conventional portable power saws which are integral with a heavy internal combustion engine, the disclosed electric pruning saw may be energized over flexible power cord 18 from a separate portable electric generator. It will be appreciated that this arrangement permits the pruning saw to be lighter in weight and to trim tree limbs at greater height above the ground than conventional portable saws. In known pruning saws of the extension handle type the distance between the saw blade and the operator makes it difficult to maintain the saw in proper cutting engagement with the limb. The guide 38 of the disclosed electric pruning saw obviates this difficulty and greatly aids the operator in the use of the saw in that it not only supports the tree limb being cut as the teeth 48 of the saw blade 12 are pulled across the limb, but it also directs the saw blade 12 and prevents buckling and twisting thereof during cutting and controls the direction of movement of the blade supporting member 33 and yet adds a minimum of weight to the saw. The disclosed pruning saw is sufficiently light so that it is easily handled by one person to cut tree limbs overhead at considerable height above the ground.

While only a single embodiment of the invention has been illustrated and described, many modifications and variations thereof will be readily apparent to those skilled in the art, and consequently it is intended in the appended claims to cover all such modifications and variations which are within the true spirit and intent of the invention.

I claim:

1. In an electric pruning saw, the combination of a hollow housing having a handle portion integral therewith, an elongated tubular pole affixed at one end to said housing, a guide affixed at one end thereof to the other end of said pole and having a noncircular opening axial of said pole and a tree limb support portion with a cross head generally transverse to the axis of said pole and a connecting portion extending from said cross head to said one end of said guide, a blade support member having a noncircular cross section complementary to said opening and being reciprocable longitudinally within said opening, a pruning saw blade, means for securing said blade to said blade support member, said limb support portion having longitudinal and transverse blade guiding slots therein slidably receiving said blade providing continuous lateral support to said blade from said blade support member to said cross head to prevent buckling thereof during cutting, an electric motor within said housing having an output shaft, an elongated operating rod extending axially within said tubular pole and being affixed at one end to said blade support member, power transmitting means within said housing having the input operatively connected to said rod and means for converting rotation of said power transmitting means into reciprocation of said saw blade.

2. An electric pruning saw in accordance with claim 1 wherein said tree limb support portion cross head presents a limb engaging surface forming an acute angle with the cutting edge of said saw blade and the cutting teeth along the cutting edge of said saw blade are arranged to cut as said saw blade is drawn toward said cross head.

3. In an electric pruning saw in accordance with claim 1 wherein said tree limb support portion is bifurcated and each of the furcations defines one wall of said blade guiding slots and is integral with said guide.

4. In an electric pruning saw in accordance with claim 3 wherein each said furcation includes a first portion integral with said shank and extending generally parallel to the axis of said pole and a cross head transverse to said first portion and spaced from said shank and wherein said guide also includes a brace portion which is integral with both said furcations and is disposed at an acute angle to said axis and connects said shank to the radially outer portion of said transverse cross head of both of said furcations and mechanically strengthens said cross head.

References Cited
UNITED STATES PATENTS

| | | |
|---|---|---|
| 1,787,057 | 12/1930 | Ward. |
| 2,619,721 | 12/1952 | King _____ 30—166 |
| 2,662,562 | 12/1953 | Lindell _____ 30—167 |
| 2,954,807 | 10/1960 | Sweeney et al. |

WILLIAM FELDMAN, *Primary Examiner.*

R. V. PARKER, *Examiner.*